United States Patent
DiMatteo et al.

(12)

(10) Patent No.: US 6,232,546 B1
(45) Date of Patent: May 15, 2001

(54) MICROCAVITY APPARATUS AND SYSTEMS FOR MAINTAINING A MICROCAVITY OVER A MACROSCALE AREA

(75) Inventors: Robert Stephen DiMatteo, Stoughton; Marc Steven Weinberg, Needham; Gregory A. Kirkos, Somerville, all of MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 09/426,542

(22) Filed: Oct. 25, 1999

Related U.S. Application Data

(63) Continuation-in-part of application No. 08/902,817, filed on Jul. 30, 1997, now Pat. No. 6,084,173.

(51) Int. Cl.$^7$ .......................... H01L 31/058; H01L 35/00
(52) U.S. Cl. .......................... 136/253; 136/201; 136/200; 310/306; 438/57; 438/73; 438/90
(58) Field of Search .................................. 136/253, 201, 136/200; 310/306; 438/57, 73, 90

(56) References Cited

U.S. PATENT DOCUMENTS

| | | |
|---|---|---|
| 4,128,732 | 12/1978 | Kaplow et al. . |
| 4,667,126 * | 5/1987 | Fitzpartick ........................... 310/306 |
| 4,776,895 | 10/1988 | Goldstein . |
| 5,057,162 | 10/1991 | Nelson . |
| 5,571,339 | 11/1996 | Ringel et al. . |
| 5,605,171 | 2/1997 | Tam . |
| 5,611,870 | 3/1997 | Horne et al. . |
| 5,616,186 | 4/1997 | Fraas et al. . |
| 5,700,332 | 12/1997 | Brown et al. . |
| 5,753,050 | 5/1998 | Charache et al. . |
| 5,769,964 | 6/1998 | Charache et al. . |
| 5,837,929 | 11/1998 | Adelman . |
| 5,861,226 | 1/1999 | Horne et al. . |
| 5,865,906 | 2/1999 | Ferguson et al. . |
| 5,867,990 | 2/1999 | Ghoshal . |
| 6,048,173 * | 7/2000 | DiMatteo ............................ 136/201 |

OTHER PUBLICATIONS

Raynolds, J.E., Enhanced electro–magnetic energy transfer between a hot and cold body at close spacing due to evanescent fields, 1999, AIP Conference Proceedings 460, Thermophotovoltaic Generation of Electricity, Fourth NREL Conference, Denver, CO, Oct. 1998, pp. 49–57.

Dalvit, Diego, A.R., and Mazzitelli, Francisco D., Creation of photons in an oscillating cavity with two moving mirrors (Physical Review A, vol. 59, No. 4 (Apr. 1999).

DiMatteo, R.S., Enhanced Semiconductor Carrier Generation Via Microscale Radiative Transfer. . . , Jun. 1996, Thesis, Department of Electrical Engineering and Computer Science, Massachusetts Institute of Technology, Cambridge, Massachusetts, pp. 1–86 and 157–162.

Whale, M.D., A Fluctuational Electrodynamic Analysis of Microscale Radiative Transfer and the Design of Microscale Thermophotovoltaic Devices, Jun. 1997, PhD Thesis, Department of Mechanical Engineering, Massachusetts Institute of Technology, Cambridge, Massachusetts.

Wu, Ying, Chu, M.C., and Lueng P.T., Dynamics of the quantized radiation field in a cavity vibrating at the fundamental frequency, Physical Review, vol. 59, No. 4 (Apr. 1999).

* cited by examiner

Primary Examiner—Alan Diamond
(74) Attorney, Agent, or Firm—Iandiorio & Teska

(57) ABSTRACT

A microcavity apparatus and systems for maintaining microcavity spacing over a macroscopic area. An application of this invention is a microscale generator. This microscale generator includes a first element for receiving energy; a second element, opposite the first element for transferring energy; at least one panel on either of the first element or the second element, the panel facing the other element; a device for controlling the distance between the at least one panel and the facing element to form a predetermined, sub-micron gap between the panel and the facing element for increasing energy transfer to the element for receiving; and a device, responsive to the energy transfer, for generating electricity.

37 Claims, 4 Drawing Sheets

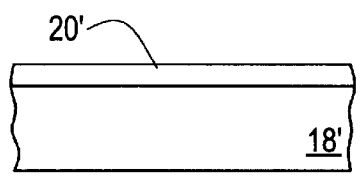
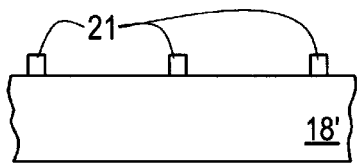
FIG. 7A    FIG. 7B
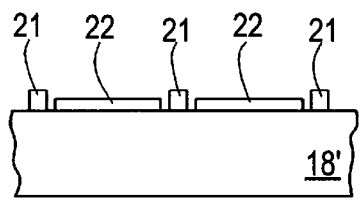
FIG. 7C    FIG. 7D
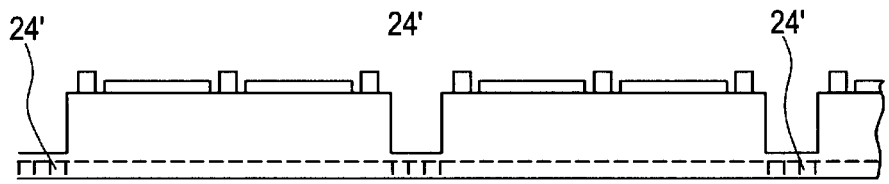
FIG. 7E
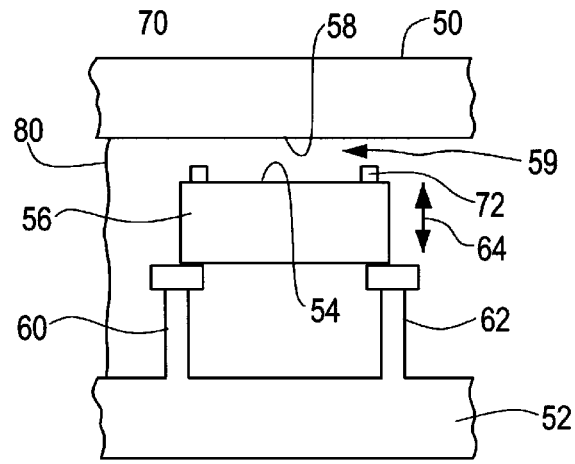
FIG. 8

MICROCAVITY APPARATUS AND SYSTEMS FOR MAINTAINING A MICROCAVITY OVER A MACROSCALE AREA

RELATED APPLICATIONS

This application is a continuation-in-part application of U.S. application Ser. No. 08/902,817 filed Jul. 30, 1997 now U.S. Pat. No. 6,084,173.

FIELD OF INVENTION

This invention relates to a system for maintaining a microcavity over a microscale area. This invention also relates to thermophotovoltaic devices, and more particularly to a microscale thermophotovoltaic generator.

BACKGROUND OF INVENTION

It has been shown that electromagnetic energy transfer between a hot and a cold body is a function of the close spacing of the bodies due to evanescent coupling of near fields. Thus, the closer the bodies, approximately one micron and below, the greater the power transfer. For gap spacings of 0.1 microns, increases in power output of factors often are common.

The dilemma, however, is maintaining the close spacing at a sub-micron gap in order to maintain the enhanced performance.

While it is possible to obtain the sub-micron gap spacing, the thermal effects on the hot and cold surfaces induce cupping, warping or deformation of the elements resulting in variations in gap spacing thereby resulting in uncontrollable variances in the power output.

Typically, in order to increase power output, given the lower power density of prior devices, it has been necessary to increase the temperature. However, the temperature increase is limited by the material of the device.

SUMMARY OF THE INVENTION

It is therefore an object of this invention to provide a microscale generator which provides greater energy transfer in a smaller generator.

It is a further object of this invention to provide such a microscale generator which converts the transferred energy to electricity more efficiently.

It is a further object of this invention to provide such a microscale generator which can generate electricity at lower temperatures.

It is a further object of this invention to provide such a microscale generator which provides consistent power output.

It is a further object of this invention to provide such a microscale generator which can produce an alternating output.

It is a further object of this invention to provide such a microscale generator which does not produce vibrations.

It is a further object of this invention to provide such a microscale generator which has no macroscopic moving parts.

It is a further object of this invention to provide such a microscale generator which can be made variable in size with different applications and power requirements.

It is a further object of this invention to provide such a microscale generator which may be fabricated on a single chip.

It is a further object of this invention to provide a microcavity system for systems other than photovoltaic generators.

The invention results from the realization that a microscale thermophotovoltaic generator may be achieved having two facing elements, one for receiving energy and one for transferring energy, with at least one panel disposed on either or both of the elements, facing the other element, and including a device for controlling the spacing between panel and the facing element to a predetermined, sub-micron gap for increasing the energy transfer to the receiving element. A conversion device, responsive to the increased energy transfer, generates electricity.

The invention further results from the realization that by controllably varying the size of the predetermined gap, an alternating output may be produced.

This invention features a microscale generator having a first element for receiving energy, a second element, opposite the first element, for transferring energy and at least one panel (shown as 18 in FIGS. 1, 2, and 3) on either of the first element or the second element, the panel facing the other element. There is a device for controlling the distance between the at least one panel and the facing element to form a predetermined, sub-micron gap between the panel and the facing element for increasing the energy transfer to the element for receiving and a converter, responsive to the energy transfer, for generating electricity.

In a preferred embodiment the device for controlling may include an actuating flexure for urging the panel toward the facing element to form the predetermined sub-micron gap, the flexure thermally coupling the panel to the element. The flexure may be disposed below the panel or the flexure may be disposed about the perimeter of the panel or both. There may be at least one spacer disposed on the panel between the panel and the facing element for maintaining the predetermined sub-micron gap between the panel and the facing element. The flexure may include a spring to passively urge the panel towards the facing element to maintain the predetermined sub-micron gap. The flexure may include a piezoelectric actuator responsive to a control circuit which selectively applies a voltage to actuator for controlling the sub-micron gap for urging the panel toward the facing element. The device for controlling may include at least one spacer disposed on the panel between the panel and the facing element for maintaining the predetermined sub-micron gap. The spacer may include a thermally resistant material. The thermally resistant material may include a piezoelectric material. There may be a control circuit for actuating the spacer to maintain the sub-micron gap. The first element may be at a higher temperature than the second element and the panel may be on the first element. The first element may be at a lower temperature than the second element and the panel may be on the first element. The first element and the second element may be at the same temperature.

The invention features a thermophotovoltaic generator having a first element for receiving energy, a second element, opposite the first element, for transferring energy, at least one panel on either of the first element or the second element, the panel facing the element, an actuator for controlling the distance between the at least one panel and the facing element to form a predetermined sub-micron gap between the panel and the facing element for increasing energy transfer to the element for receiving, and a converter, responsive to the energy transfer, for generating electricity.

In the preferred embodiment the actuator may be disposed about the perimeter of the panel, thermally coupling the panel to the first or second element. The actuator may be a spring for urging the panel toward the facing element. The actuator may be a piezoelectric element responsive to a control circuit which selectively applies a voltage to the piezoelectric actuator for controlling the predetermined sub-micron gap. The actuator may be disposed on the panel, between the panel and the facing element, to form at least one spacer for maintaining the sub-micron gap between the panel and the facing element. The actuating spacer may include a piezoelectric element, responsive to a control circuit which selectively applies a voltage to the spacer to control the sub-micron gap.

BRIEF DESCRIPTION OF THE DRAWINGS

Other objects, features and advantages will occur to those skilled in the art from the following description of a preferred embodiment and the accompanying drawings, in which:

FIGS. 7A–7E depict a schematic representation of the fabrication process for creating the independent, individual panels of FIG. 2; and FIG. 8 is a cross sectional view of one embodiment of the system for maintaining a microcavity over a macroscale in accordance with this invention.

DISCLOSURE OF PREFERRED EMBODIMENT

Figure 1:
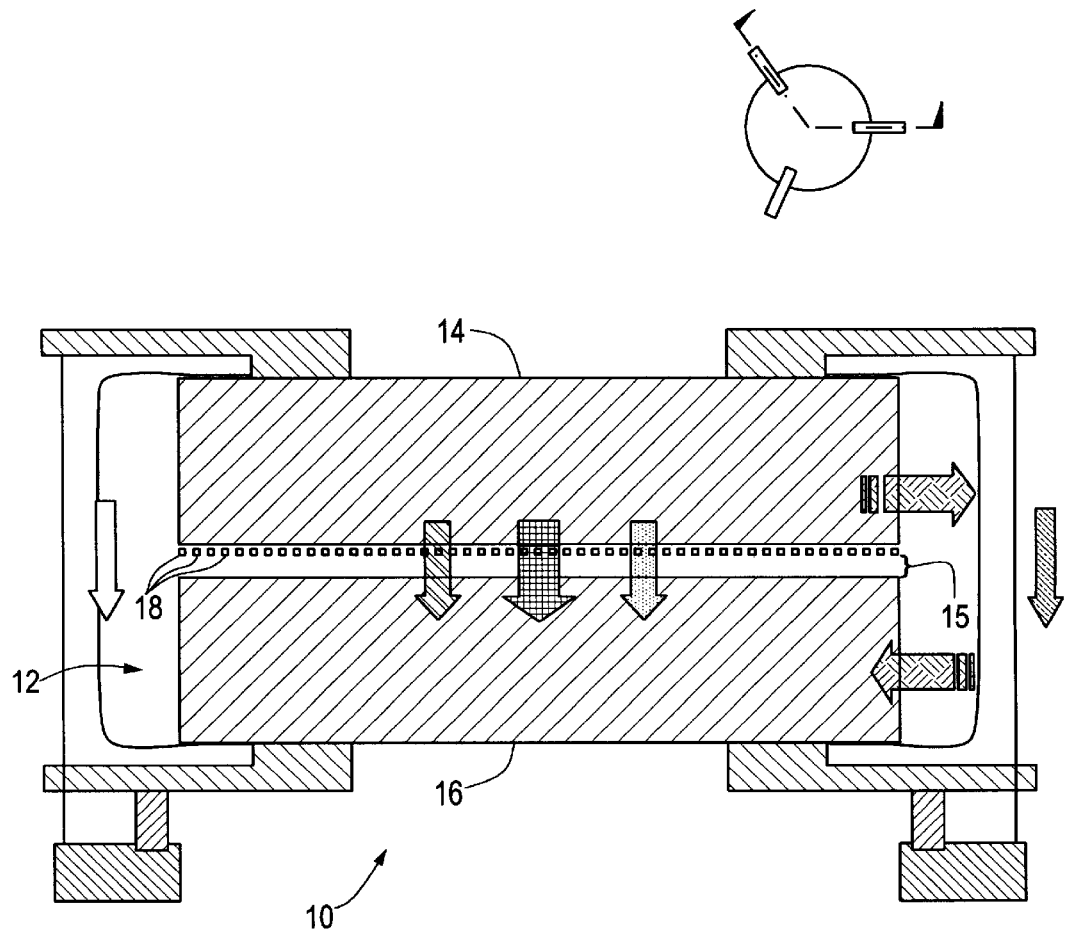
FIG. 1 is a schematic diagram of the microscale generator according to the present invention having two facing elements with a plurality of panels forming a paneled array therebetween.

Microscale generator 10, FIG. 1, typically includes a pair of facing elements 14 and 16 within vacuum 12 having a temperature gradient therebetween. First element 14 acts as a thermal source for transferring energy and second element 16 receives the energy transferred. However, this is not a necessary limitation of the invention as element 16 could instead act as the thermal source while element 14 receives the energy. In order to maintain a fixed spacing between elements 14 and 16, one of the facing elements is sectioned into much smaller surface areas (referred to below as panels) which easily conform to variations in the surface of the facing element.

Disposed on one of the facing elements, shown here as first element 14, is an array of individual, independently passively or actively moveable panels 18 which are thermally coupled to element 14 and spaced from facing element 16 a predetermined, sub-micron distance to efficiently and evanescently couple the energy between elements 14 and 16 and to convert it to electricity by device(s) on element 16 either thermoelectrically, thermophotovoltaically, and/or by thermo antenna coupled rectification. Thermoionic coupling is also possible in accordance with this invention. Moreover, by maintaining a sub-micron gap, facing elements 14 and 16 do not require a temperature gradient as, for example, photon generation may also occur.

As an example, rather than a limitation, first element 14 is typically a material, such as silicon, fabricated using MicroElectro Mechanical Systems (MEMS) technology, to produce independent, movable panels 18 to form a paneled array which adapts and conforms to surface variations in the facing, photovoltaic element 16, such as InGaAs, GaSb or InAs, to maintain the predetermined, sub-micron spacing between element 16 and panels 18. Maintaining sub-micron spacing 15 increases the power density with which energy is transferred between element 16 and panels 18. That is, the amount of electrically convertible energy is dramatically increased thereby providing more power output for the same temperature difference as compared to conventional devices. Moreover, due to the increased power transfer of microscale generator 10, increased power output may be achieved with even less of a temperature difference than conventional devices. The power is extracted from element 16 using conventional techniques, e.g., creation of electron hole pairs in the photovoltaic element producing a current. Depending on the power requirements, there may be as few or as many panels 18 as required to provide the desired output. Smaller temperature differences generally require fewer and larger panel(s). By maintaining a small surface area, typically 800 $\mu$m by 800 $\mu$m, panels 18 can interface along and conform to the entire surface of element 16 such that the sub-micron spacing between each individual panel 18 and facing element 16 is maintained and therefore the power extracted is also consistent. Because the power transfer is substantially increased, not only is more power extracted with the same temperature difference, but more power may actually be extracted with a lower temperature "hot side", even as low as room temperature.

Figure 2:
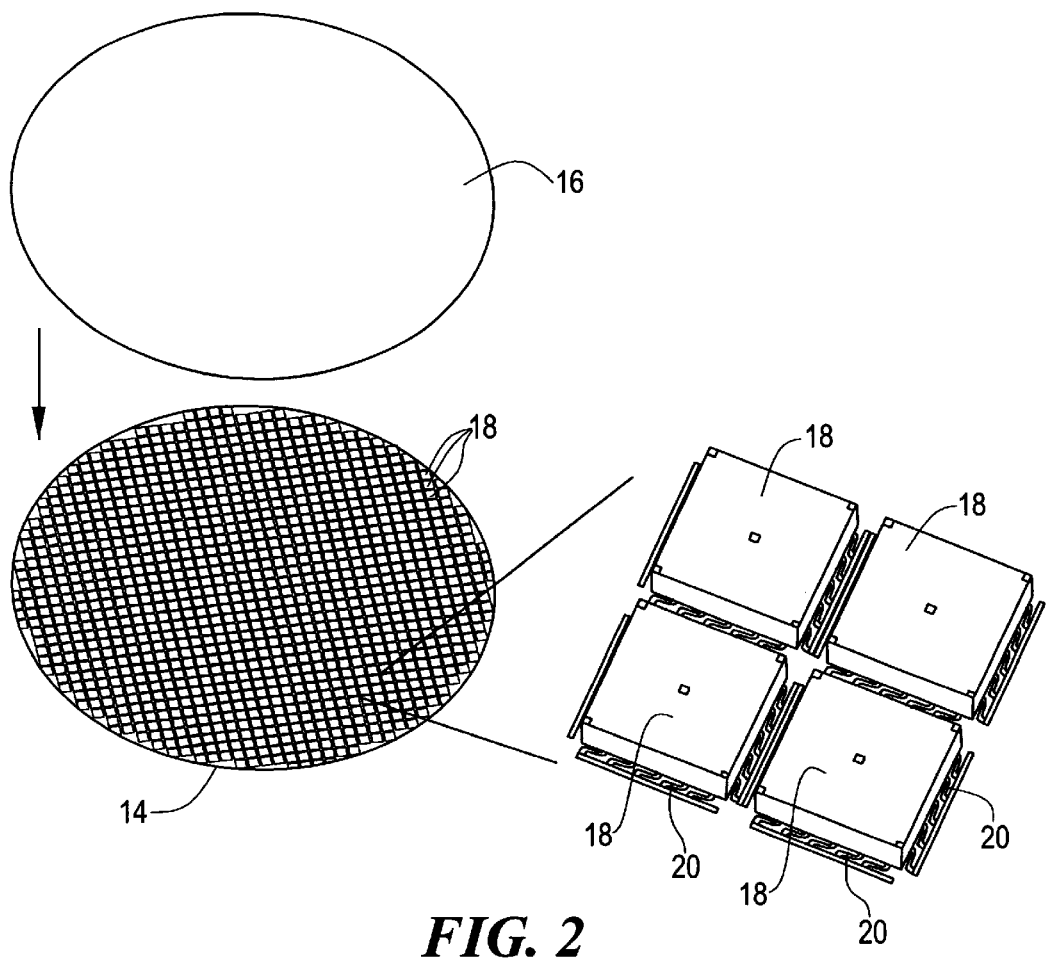
FIG. 2 is an exploded, three-dimensional view of the paneled array of FIG. 1 mounted on one of the elements.

Independently movable panels 18, FIG. 2, are arranged in an array on element 14 and collectively conform to variations in the entire surface of receiving element 16 as the temperature increases or varies in response to a thermal source. The surface area of the panels must be small enough so that the array of panels 18 can effectively adapt to variations of the surface of elements 16 and 14. Individual panels 18 are typically spaced from one another a distance of 50–200 $\mu$m depending on the size of panel 18, flexures 20 and element 14.

Figure 3:
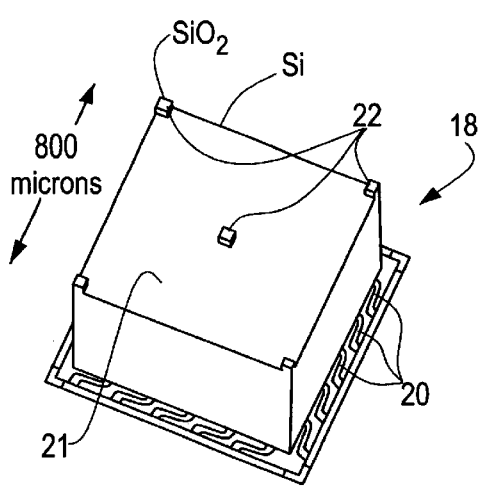
FIG. 3 is an enlarged three-dimensional view of one of the panels of FIG. 2 demonstrating the flexures and spacers used to maintain the spacing between the panels and the facing element.

Each individual panel 18, FIG. 3, may include spring like actuating flexures 20 which deflect or urge panel 18 towards facing element 16, FIG. 2, thereby controlling the distance between panel 18 and facing element 16 to maintain the predetermined sub-micron spacing between them. Because each panel 18 has associated with it its own flexures 20, the panels act independently of each other to conform to surface variations in element 16, thereby compensating for micro-variations in flatness of facing element 16 or element 14 over their entire surfaces.

Flexures 20 are typically an etched material such as silicon, as discussed in greater detail with reference to FIGS. 7A–7F, and also provide a thermally conductive path from each individual panel to the element (e.g. element 14) on which it is mounted to thermally couple each panel 18 to element 14. It is important to note, however, that the longer the flexure, the longer the heat path and thus the higher the thermal resistance. A proper heat path may be obtained by making flexures 20 shorter with an appropriate width. Thus, to optimize the heat path, it must be short and thick. Yet to optimize flexibility without stressing the spacers, flexures 20 should be long and thin. Accordingly, by providing more flexures 20, more heat paths are available, and thus optimal thermal conduction occurs, while providing sufficient force to urge the panel toward the facing element. Layer 21 may be disposed on the surface of panel 18 to act as a radiating emitter. If, however, panels 18 were disposed on the receiving element, layer 21 would be an energy conversion device and would act as a receiver instead of an emitter. However, layer 21 is not a requirement when element 18 is the emitter as panel 18 may transmit energy without layer 21.

In addition to flexures 20, spacers 22 may also be provided on panel 18 which contact element 16 to prevent panel 18 from contacting element 16 to maintain the sub-micron spacing between panel 18 and receiving element 16. Moreover, it is possible to use only spacers 22 without the need for flexures 20.

Spacers 22 must be small and of low thermal conductivity to ensure that the energy is evanescently coupled between panel 18 and receiving element 16 minimizing the portion of energy through the spacers as conducted heat is not in a directly electrically convertible form. Accordingly, the ratio of the total surface area of the spacers to the total surface area of panels 18 must be very small. Spacers 22 define the sub-micron gap according to their height. Where flexures 20 are used in conjunction with spacers 22, the stiffness of flexures 20 must be such that the force with which they deflect panel 18 towards receiving element 16 does not crush spacers 22 as spacers 22 contact element 16.

Figure 4:
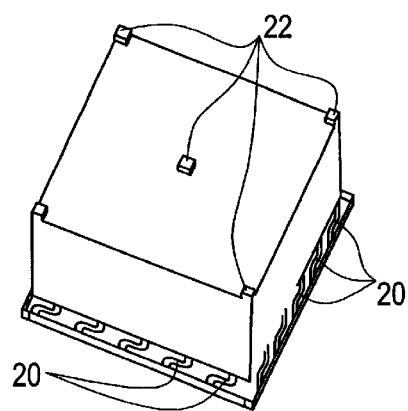
FIG. 4 is a view, similar to FIG. 3, in which the flexures are disposed underneath the panel and may be present under the entire bottom surface of the panel.

To further increase the number of panels 18 which may be fabricated on element 14, FIG. 2, and/or the coverage of element 14 by panels 18, and/or to increase the possible amount of movement of panels 18 perpendicular to element 14, flexures 20, FIG. 4, may be disposed underneath panel 18 rather than about its perimeter while still providing sufficient flex and conduction properties. Indeed, placing flexures 20 below panel 18 permits wider flexures, for increased thermal coupling, since there is more useable space beneath panel 18 than about its perimeter. Moreover, the spacing between panels 18 may be reduced to 2–20 microns from the 50–200 microns above.

Figure 5:
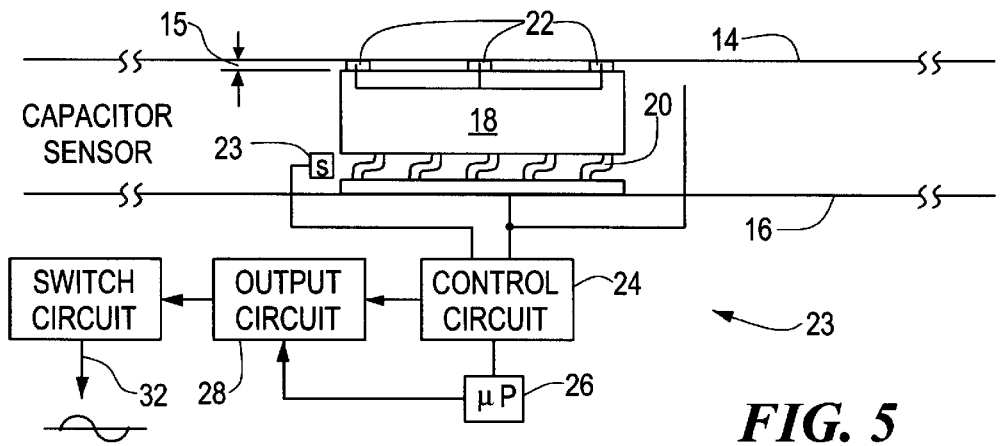
FIG. 5 is a schematic diagram of the generator according to the present invention in which the flexures or spacers are actively controlled to maintain the predetermined sub-micron spacing between the panels and the facing element.

Spacers 22 and/or flexures 20, FIG. 5, may actively or passively maintain the sub-micron gap. Moreover, control circuitry 23 may be provided underneath each panel 18 to control that individual panel. Both flexures 20 and spacers 22 may be actively controlled: flexures 20 actuating to provide coarse control and spacers 22 actuating to provide fine control of spacing 15. However, this is not a necessary limitation of the invention as flexures 20 may be actively controlled while spacers 22 are passive. In fact, if spacers are actively controlled, flexures 20 may not be necessary. Because the spacing can be selectively controlled, power output may be selectively varied to produce an alternating current.

To actively actuate panel 18, flexures 20 may for example be bi-morphs, i.e. layered piezoelectric elements. In response to microprocessor 26, control circuit 24 selectively applies different voltages to piezoelectric flexures 20 which, in response, expand or contract thereby varying sub-micron spacing 15 between element 16 and panel 18. Because the energy transfer, and thus the power output of the generator, is a function of spacing 15 between panel 18 and element 16, selectively varying spacing 15 necessarily varies the output to produce an alternating output on line 32.

One method of controlling the spacing is by sensing the capacitance between panel 18 and the element on which it is mounted via sensor 23 which feeds into control circuit 24. Control circuit 24 in response actuates either flexures 20 or spacers 22 until the appropriate capacitance is attained.

Converter circuit 28 converts the power output to a voltage. Switching circuit 30, in response to microprocessor 26, selectively switches between output voltages to produce an alternating output on line 32. Microprocessor 26 may also be used to selectively tune the generator to a specific frequency by activating flexures 20 or spacers 22.

Moreover, control circuit 24, microprocessor 26, converter circuitry 28 and switching circuit 30 may all be fabricated on the same wafer. Thus, microscale generator 10, FIG. 1, may be fabricated on a single chip or wafer.

Figure 6:
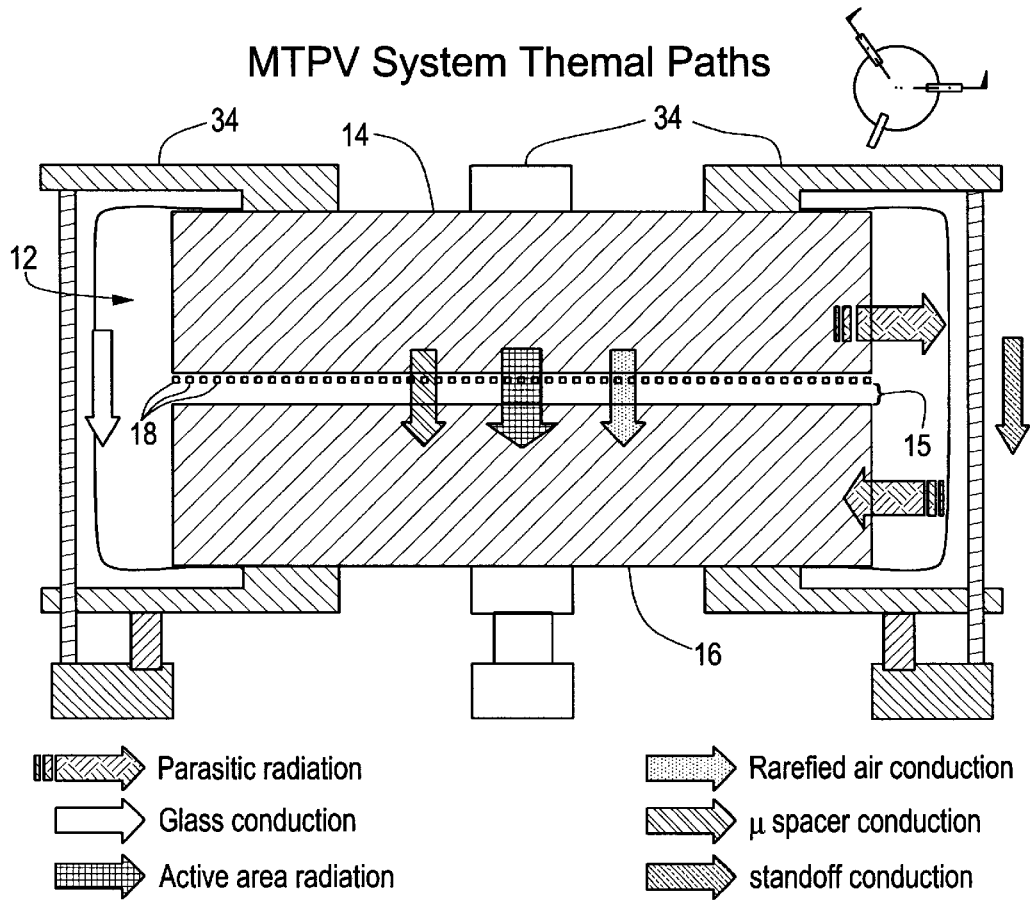
FIG. 6 is a view, similar to FIG. 1, in which the spacing between the panels and the facing element is actively controlled with actuators external to the gap.

Passive spacers 22 may also be employed without flexures. Spacing 15, FIG. 6, may be actively controlled by controlling the movement of the entire array of individual panels 18 on element 14 towards element 16 with actuators 34 evenly spaced about facing elements 14 and 16, which act as adjustable standoffs. In this instance, the element on which panels 18 are mounted must be thin and compliant permitting panels 18 to move independently to permit the array of panels 18 to conform to the surface of the facing element. Actuators 34 may include a piezoelectric actuator as discussed above. However, other actuators may be used such as an electrostatic actuator, for example a micromechanical gyroscope available from Draper Laboratories, Cambridge, Mass., as well as electromagnetically, pneumatically or hydraulically controlled actuators also well known in the art. Fluid on sides opposite the microcavity of (either or both) 14 and 16 may also be used for heating/or cooling while controlling the fluid pressures to avoid spacer crushing.

Spacing 15 may be adjusted in a manner similar to that discussed above by sensing capacitance. The capacitance between elements 14 and 16 may also be monitored by control circuit 24, which, in response to microprocessor 26, applies a voltage to actuators 34 thereby varying spacing 15.

One method for fabricating the array of individual panels 18 uses as the starting material a solid silicon wafer 18, FIG. 7A, which is polished on both sides.

An $SiO_2$ layer 20 of a thickness equal to the desired spacer height is next grown on wafer 18. The oxide layer 20 is then patterned and etched forming individual $SiO_2$ spacers 21, FIG. 7B. If the $SiO_2$ spacer heights are to be greater than the desired minimum gap formed by the spacers, then the spacers are covered with resist material to facilitate subsequent lift off leaving bare silicon between the resist around the spacers on which is deposited a material of thickness equal to the difference between the $SiO_2$ spacer height and the desired minimum gap which, after lift off, forms layer 22, FIG. 7C which is the radiating surface.

The following steps form the flexures. The opposite side of the wafer 18 is first heavily doped to created etch stop 23, FIG. 7D approximately 3 microns from the wafer surface. The etch stop layer 23 is then patterned and etched into the flexures 24, FIG. 7E. Wafer 18 is then patterned on the spacer side and reactive ion etched (RIE) from the spacer side nearly down to the etch stop layer 23 to create an array of individual islands FIG. 7E which will become the individual panels being supported by the flexures which are freed up by a final wet etch which removes the remaining thin layer of Si between the bottom of the RIE and the etch stop region 23. The flexures and mounting frame 20, FIG. 2, may then be brazed, or otherwise bonded to Si element 14.

In FIG. 8, first element 50 and second element 52 require a submicron constant or vibrating or oscillating gap as defined by surface 54 on panel 56 and surface 58 of element 50. See Diego, A. R.; and Mazzitelli, F. D., Creation of Photons in an Oscillating Cavity with Two Moving Mirrors, Physical Review A vol. 59, No. 4, 1999, The American Physical Society; and Wu, Y. and Leung, P. T., Dynamics of Quantified Radiation Field in a Cavity Vibrating at the Fundamental Frequency, Physical Review A, vol. 59., No. 4, 1999, the American Physical Society, incorporated herein by this reference.

As such, a number of panels 56 are disposed on surface 52 via flexure devices 60, 62 which allow panel 56 to move with respect to element 52 in the direction shown by arrow 64 to position surface 54 at a predetermined spacing from surface 58 of element 50. Also included may be protrusions or spacers 70 and 72 for limiting spacing between surface 58 and surface 54. Thus, the subject invention is not limited to thermophotovoltaic generators.

In a thermophotovoltaic generator, if element 50 receives thermal energy, spacers 70 and 72 should be small to prevent heat transfer through conduction but not so small and fragile that they are crushed by the flexure force of flexures 60 and 62. Flexures 60 and 62 are made more flexible by making them longer and thinner. A flexible membrane 8 may also be disposed between elements 50 and 52 and/or between adjacent elements 56 for sealing, if required.

In some embodiments, element 50 may be pressed against spacers 70 and 72 flexing flexures 60 and 62 slightly. Flexures 60 and 62 and spacers 70 and 72 will then keep micron or submicron gap 54 at the desired spacing. In other embodiments, flexures 70 and 72 will be rendered active to compensate for dimensional changes in elements 50, 52 and/or to create an oscillating or vibratory gap 54.

Thus, the generator of the present invention provides greater power density and/or efficiency than prior devices yet may be contained on a single chip or large arrays. Moreover, the generator may also produce an alternating current or run in reverse to heat or cool.

Although specific features of the invention are shown in some drawings and not in others, this is for convenience only as each feature may be combined with any or all of the other features in accordance with the invention.

Other embodiments will occur to those skilled in the art and are within the following claims:

What is claimed is:

1. A microscale generator comprising:
   a first element for receiving energy;
   a second element, opposite said first element, for transferring energy;
   at least one panel on either of the first element or the second element, the panel facing the other element;
   a device for controlling the distance between the at least one panel and the facing element to form a sub-micron gap between the panel and the facing element for increasing energy transfer to the element for receiving; and
   a converter, responsive to the energy transfer, for generating electricity.

2. The microscale generator of claim 1 in which the device for controlling includes an actuating flexure for urging the panel toward or away from the facing element to form the sub-micron gap, the flexure thermally coupling the panel to the element to which the panel is attached.

3. The microscale generator of claim 2 in which the actuating flexure is disposed below the panel.

4. The microscale generator of claim 2 in which the flexure is disposed about the perimeter of the panel.

5. The microscale generator of claim 2 further including at least one spacing element disposed on the panel between the panel and the facing element for maintaining the sub-micron gap between the panel and the facing element.

6. The microscale generator of claim 5 in which the flexure includes and also serves as a spring to passively urge the panel towards the facing element to maintain the sub-micron gap.

7. The microscale generator of claim 2 in which the flexure includes a piezoelectric actuator responsive to a control circuit which selectively applies a voltage to the actuator for controlling the sub-micron gap.

8. The microscale generator of claim 1 in which the device for controlling includes at least one spacer disposed on the panel between the panel and the facing element for maintaining the sub-micron gap.

9. The microscale generator of claim 8 in which the spacer includes a thermally resistant material.

10. The microscale generator of claim 9 in which the thermally resistant material includes a piezoelectric material.

11. The microscale generator of claim 10 further including a control circuit for activating the spacer to maintain the sub-micron gap.

12. The microscale generator of claim 2 in which the first element is at a higher temperature than the second element.

13. The microscale generator of claim 12 in which the panel is on the first element.

14. The microscale generator of claim 1 in which the first element is at a lower temperature than the second element.

15. The microscale generator of claim 14 in which the panel is on the first element.

16. The microscale generator of claim 1 in which the first element is at the same temperature as the second element.

17. A thermophotovoltaic generator comprising:
    a first element for receiving energy;
    a second element, opposite the first element, for transferring energy;
    at least one panel on either or both of the first element and the second element, the panel facing the other element;
    an actuator for controlling the distance between the at least one panel and the facing element to form a sub-micron gap between the panel and the facing element for increasing energy transfer to the element for receiving; and
    a converter, responsive to the energy transfer, for generating electricity.

18. The thermophotovoltaic generator of claim 17 in which the actuator is disposed about the perimeter of the panel, thermally coupling the panel to one of the first and second element.

19. The thermophotovoltaic generator of claim 18 in which the actuator is a spring loaded flexure for urging the panel toward the facing element.

20. The thermophotovoltaic generator of claim 17 in which the actuator includes a piezoelectric element responsive to a control circuit which selectively applies a voltage to the piezoelectric actuator for controlling the sub-micron gap.

21. The thermophotovoltaic generator of claim 17 in which the actuator is disposed on the panel, between the panel and the facing element, to form at least one spacer for maintaining the sub-micron gap between the panel and the facing element.

22. The thermophotovoltaic generator of claim 21 in which the actuating spacer includes a piezoelectric element, responsive to a control circuit which selectively applies a voltage to the spacer to control the sub-micron gap.

23. A system for maintaining a microcavity over a macroscale, the system comprising:

a first element;

a second element spaced from the first element;

an array of panels mounted on the second element having surfaces facing the first element defining a sub-micron gap between the panel surfaces and the first element; and a device associated with each panel which allows each panel to move with respect to the second element to position each panel's surface at a spacing from the first element thereby defining a microcavity between the first and second elements.

24. The system of claim 23 in which each panel's surface includes protrusions thereon which are engagable with the first element for limiting the spacing between each panel's surface and the first element.

25. The system of claim 23 in which the device includes flexural elements connected between at least one panel of the array of panels and the second element for passively maintaining the spacing between each panel's surface and the first element.

26. The system of claim 23 in which the device includes an actuator connected between at least one panel of the array of panels and the second element for actively maintaining the spacing between each panel's surface and the first element.

27. The system of claim 23 in which the first element is positioned to receive thermal energy.

28. The system of claim 27 in which the second element is connected to a converter for generating electricity in response to thermal energy transferred from the first element to the panel surfaces.

29. The system of claim 23 in which the microcavity is an oscillating cavity and the device includes an actuator for moving each panel to cause oscillations in the cavity.

30. A microelectro mechanical cell comprising a pair of juxtaposed parallel opposing planar surfaces separated by a microgap of spacing, one surface comprising a mosaic of similar planar silicon surfaces each provided with silicon dioxide protrusions at a plurality of points on each silicon surface, the mosaic being mounted against the other surface with said protrusions of each silicon surface contacting the other surface.

31. The microelectro mechanical cell of claim 30 wherein the silicon surfaces are each flexible to control the mounting against said other surface.

32. The microelectro mechanical cell of claim 30 wherein means is provided for maintaining the surfaces at different temperatures.

33. The microelectro mechanical cell of claim 31 wherein a sensor is provided for sensing said spacing, and means is provided responsive to said sensing for varying the spacing through flexing of one or more of the silicon surfaces.

34. A method of constructing a microelectro mechanical cell comprising a planar photovoltaic surface juxtaposed with a parallel mosaic of planar silicon surfaces therefrom to define a microgap there between to provide such a microgap of uniform spacing that comprises oxidizing a plurality of marginal points of each silicon surface that is to oppose the photovoltaic surface to grow corresponding silicon oxide protrusions from the silicon surfaces; and juxtaposing the mosaic and photovoltaic surfaces with the silicon oxide protrusions of each silicon surface resting on the opposing points of the juxtapose photovoltic surface.

35. The method of claim 34 and in which the opposing silicon surfaces are made compliant to flex upon such juxtaposition.

36. The method of claim 34 wherein said microgap is evacuated.

37. The method of claim 34 where the photovoltaic surface is heated.

* * * * *